United States Patent
Kinbara et al.

(10) Patent No.: US 10,724,847 B2
(45) Date of Patent: Jul. 28, 2020

(54) OPTICAL MEASURING DEVICE

(71) Applicant: MITUTOYO CORPORATION, Kanagawa (JP)

(72) Inventors: Keigo Kinbara, Kanagawa (JP); Ryusuke Kato, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 239 days.

(21) Appl. No.: 16/020,029

(22) Filed: Jun. 27, 2018

(65) Prior Publication Data
US 2019/0003821 A1    Jan. 3, 2019

(30) Foreign Application Priority Data
Jun. 30, 2017 (JP) ................ 2017-128275

(51) Int. Cl.
*G01B 11/00* (2006.01)
*G01B 11/26* (2006.01)
*G01B 11/02* (2006.01)

(52) U.S. Cl.
CPC .......... *G01B 11/002* (2013.01); *G01B 11/028* (2013.01); *G01B 11/26* (2013.01)

(58) Field of Classification Search
CPC ...... G01B 11/028; G01B 11/26; G01B 11/002
See application file for complete search history.

(56) References Cited

U.S. PATENT DOCUMENTS

| | | | |
|---|---|---|---|
| 3,853,406 A | 12/1974 | Zanoni | |
| 4,105,925 A * | 8/1978 | Rossol | G01B 11/002 250/559.36 |
| 9,068,821 B2 | 6/2015 | Fujimoto | |
| 2010/0150584 A1 | 6/2010 | Mitsutake | |
| 2013/0342852 A1 | 12/2013 | Fujimoto | |

FOREIGN PATENT DOCUMENTS

| | | |
|---|---|---|
| JP | 8-247726 A | 9/1996 |
| JP | 2014-006134 A | 1/2014 |

OTHER PUBLICATIONS

Oct. 12, 2018 European Search Report in Corresponding European Application No. 18176744.3.

* cited by examiner

*Primary Examiner* — Hina F Ayub
*Assistant Examiner* — Amanda Merlino
(74) *Attorney, Agent, or Firm* — Greenblum & Bernstein, P.L.C.

(57) ABSTRACT

An illumination unit emits a light parallel to a first direction to a measurement space. A light receiving unit outputs a signal indicating a two-dimensional distribution of a light incident on a light receiving surface. An optical system guides the light passing through the measurement space to the light receiving surface. A control unit detects a position of the measurement object in the first direction based on the signal. The light receiving surface is tilted by a predetermined angle around a second direction with respect to a transmission direction of the light. The control unit detects a position where light intensity is changed by a predetermined value in the second direction in the two-dimensional distribution, detects a position where the detected position is located in a third direction, and detects a position where the measurement object is placed in the first direction in the measurement space.

8 Claims, 11 Drawing Sheets

OPTICAL MEASURING DEVICE

INCORPORATION BY REFERENCE

This application is based upon and claims the benefit of priority from Japanese patent application No. 2017-128275, filed on Jun. 30, 2017, the disclosure of which is incorporated herein in its entirety by reference.

BACKGROUND

The present invention relates to an optical measuring device.

An optical measuring device that emits a light to a measurement object, receives a transmitted light or reflected light by an image sensor, and measures a received light intensity distribution in order to measure a dimension, a position and a shape of the measurement object has been known.

As the optical measuring device, an optical measuring device capable of detecting the position of the measurement object placed in a measurement space has been proposed (Japanese unexamined patent application publication No. 2014-6134). In the optical measuring device, an illumination unit emits the light to the measurement space in which the measurement object is placed. The light passing through the measurement space is guided to a first image sensor thorough a first optical system and to a second image sensor through a second optical system. An edge position of the measurement object in a direction perpendicular to an optical axis is calculated based on an output signal of the first image sensor. The optical measuring device is configured in such a manner that a first focal position of the first optical system and a second focal position of the second optical system in an optical axis direction are different from each other in the measurement space. Therefore, based on the output signals of the first and second image sensors, it is possible to determine where the measurement object is located in the optical axis direction with respect to the first focal position.

SUMMARY

However, the above-described optical measuring device has some problems described below. In the above-described optical measuring device, two image sensors respectively receive the lights through the two optical systems in order to detect the position of the measurement object using the respective focal points. Thus, not only a two-dimensional image sensor for measurement but also two one-dimensional image sensors for position detection are required. Further, in order to guide the lights to the image sensors for position detection, optical components for splitting or orienting the lights such as beam splitters and half mirrors are also required. As a result, the number of the optical components is increased and the size of the optical measuring device becomes larger. Therefore, this leads to high cost of the optical measuring device and a great amount of effort is required for adjusting each optical component.

The present invention has been made in view of the above-described circumstances and an object of the present invention is to easily achieve an improvement in measurement accuracy in an optical measuring device.

A first exemplary aspect of the present invention is an optical measuring device including: an illumination unit configured to emit a light parallel to a first direction to a measurement space in which a measurement object is placed; a light receiving unit configured to output a signal indicating a two-dimensional distribution of a light incident on a light receiving surface; an optical system configured to guide the light passing through the measurement space to the light receiving surface of the light receiving unit; and a control unit configured to detect a position of the measurement object in the first direction based on the signal output from the light receiving unit, in which the light receiving surface of the light receiving unit is tilted by a predetermined angle around an axis parallel to a second direction that is perpendicular to the first direction with respect to an transmission direction of the light incident on the light receiving surface, and the control unit detects a position where light intensity is changed by a predetermined value in the second direction in the two-dimensional distribution of the light based on the signal output from the light receiving unit, detects a position where the detected position is located in a third direction that is perpendicular to the second direction, and detects a position where the measurement object is placed in the first direction in the measurement space based on the detected position.

A second exemplary aspect of the present invention is the above-described optical measuring device, in which the control unit: detects a differential value distribution of light intensity in the second direction in the two-dimensional distribution at two or more positions in the third direction based on the signal output from the light receiving unit, detects the position in the third direction where an absolute value of an extreme value of the differential value distribution becomes the maximum, and detects the position in the first direction where the measurement object is placed in the measurement space based on the detected position in the third direction.

A third exemplary aspect of the present invention is the above-described optical measuring device, in which when the absolute value of the extreme value of the differential value distribution in the second direction detected at the two or more positions in the third direction falls within a predetermined range, it is determined that the measurement object is rotated by the predetermined angle around the axis parallel to the second direction.

A fourth exemplary aspect of the present invention is the above-described optical measuring device, in which the optical system is configured as a both-side telecentric optical system.

A fifth exemplary aspect of the present invention is the above-described optical measuring device, in which the light receiving unit is a two-dimensional image sensor including a plurality of light receiving elements, and the light receiving elements are two-dimensionally arranged in the second direction and the third direction.

A sixth exemplary aspect of the present invention is the above-described optical measuring device, in which the control unit: detects two edges of the image that are apart from each other in the second direction on the light receiving surface, detects a tilt of the two edges with respect to the third direction based on the two edges, and corrects a distance between the two edges in the second direction based on the detected tilt to calculate the distance between the two edges.

A seventh exemplary aspect of the present invention is the above-described optical measuring device, in which the two edges correspond to edges of an image of one measurement object, or one of the two edges corresponds to an edge of one of two measurement objects and the other of the two edges corresponds to an edge of the other of two measurement objects.

A eighth exemplary aspect of the present invention is the above-described optical measuring device, in which the control unit multiplies the distance between the two edges in the second direction by a cosine of an angle of the detected tilt to calculate the distance between the two edges.

According to the present invention, it is possible to easily achieve an improvement in measurement accuracy in an optical measuring device.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Exemplary embodiments according to the present invention are explained hereinafter with reference to the drawings. The same symbols are assigned to the same components throughout the drawings, and their duplicated explanations are omitted as appropriate.

First Exemplary Embodiment

Figure 1:
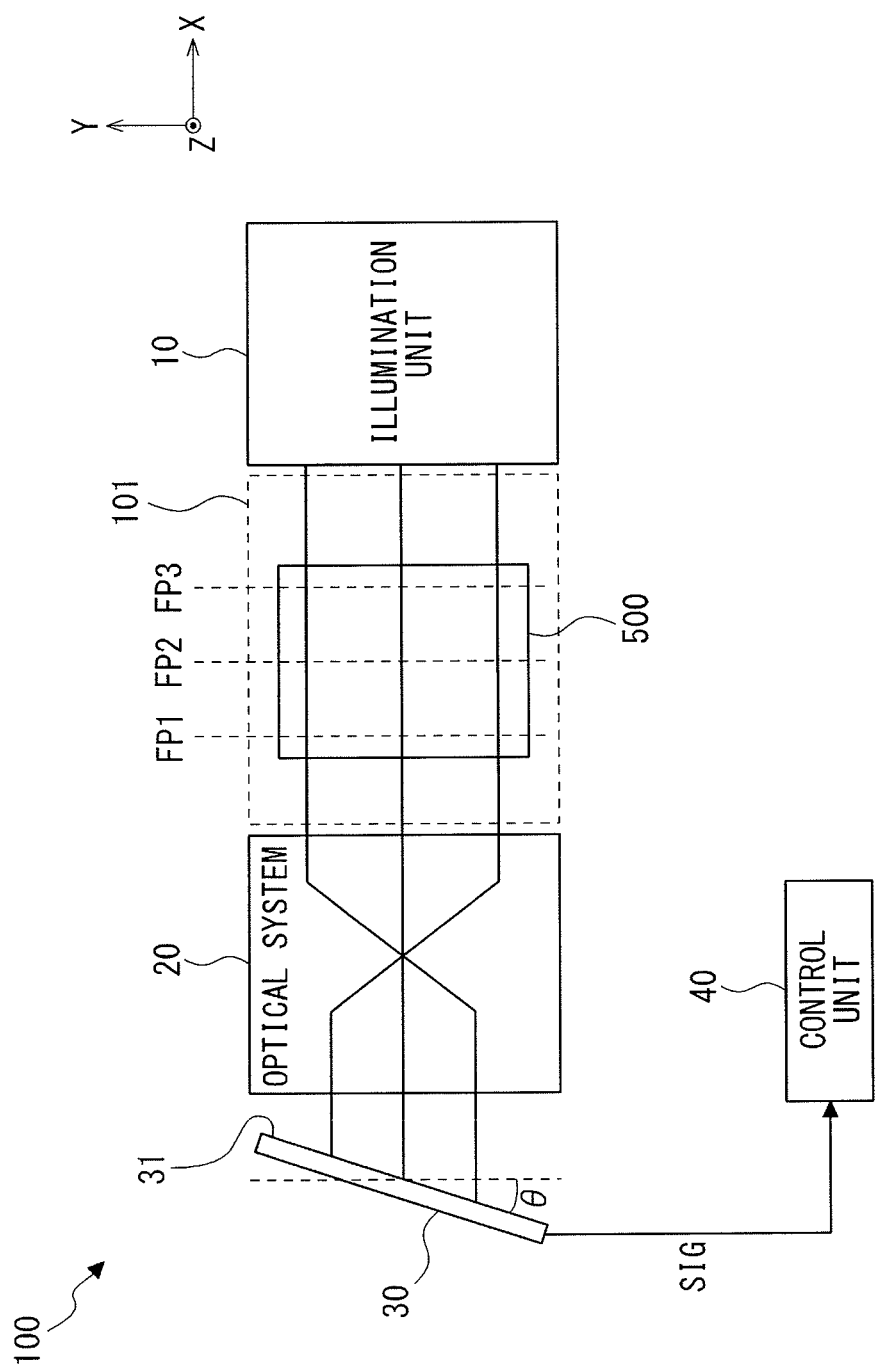
FIG. 1 is a top view of a basic configuration of an optical measuring device according to a first exemplary embodiment.
Figure 2:
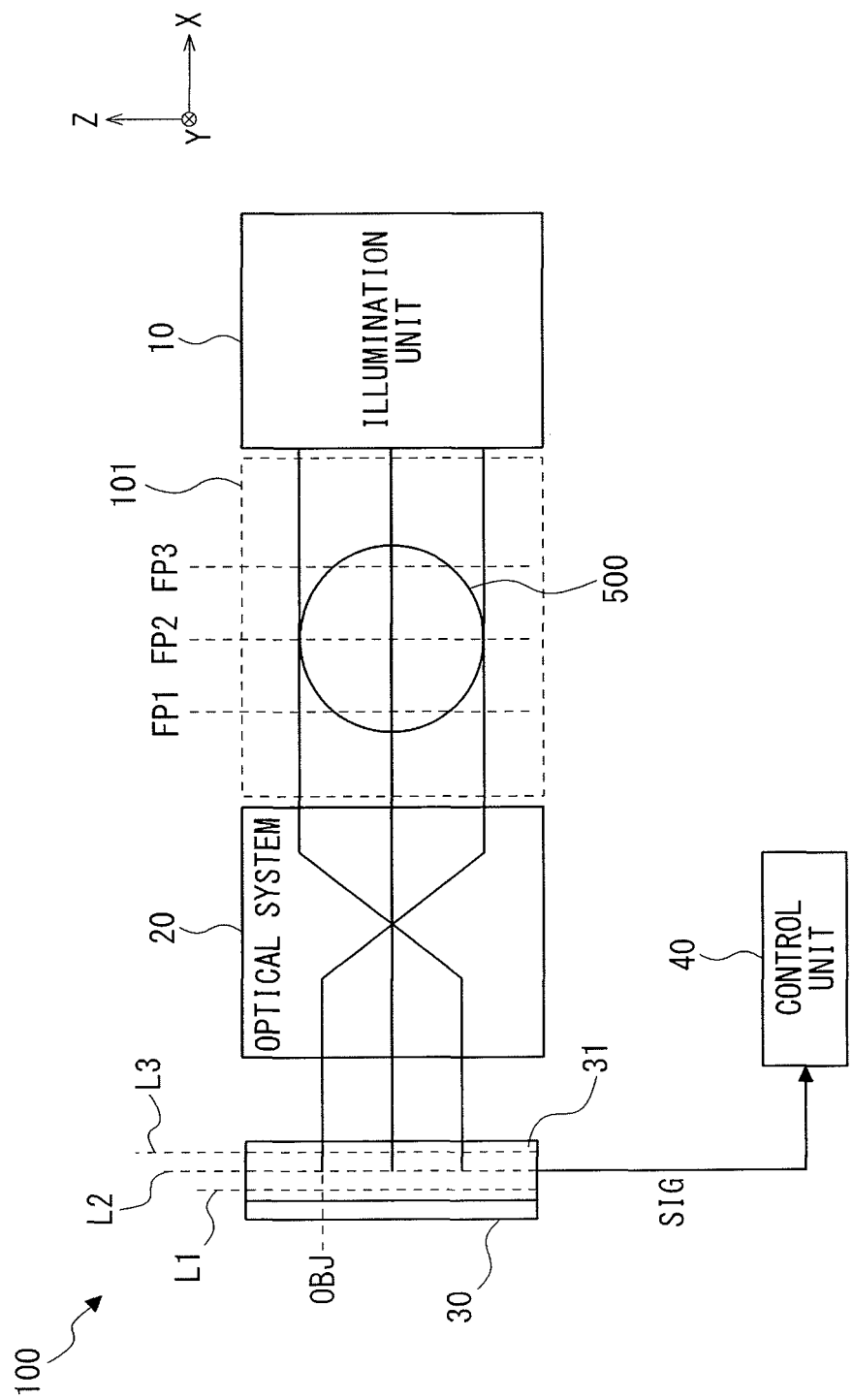
FIG. 2 is a side view of the basic configuration of the optical measuring device according to the first exemplary embodiment.
Figure 3:
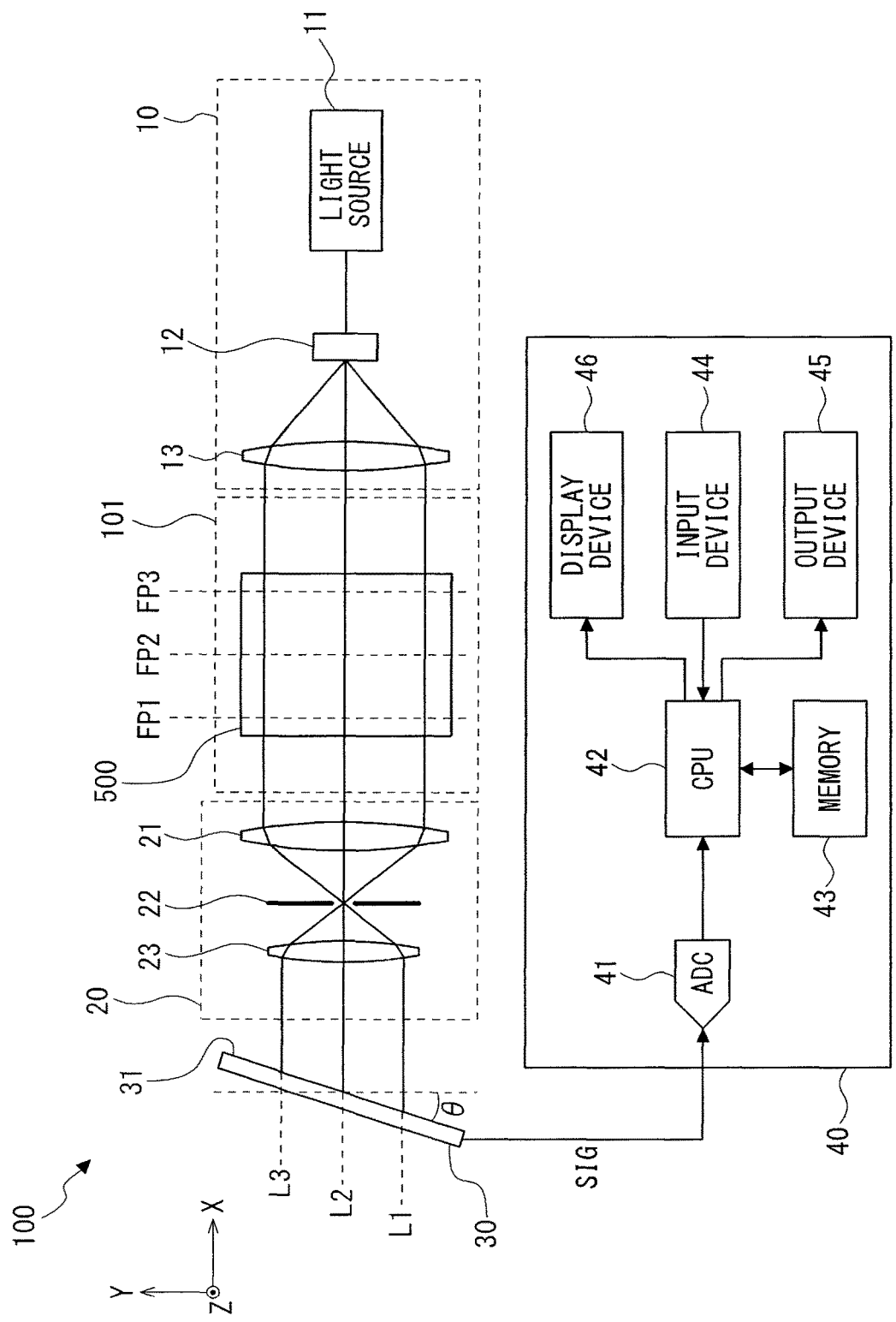
FIG. 3 schematically illustrates a configuration of the optical measuring device according to the first exemplary embodiment.

Hereinafter, an optical measuring device 100 according to a first exemplary embodiment will be described. FIG. 1 is a top view of a basic configuration of the optical measuring device 100 according to the first exemplary embodiment. FIG. 2 is a side view of the basic configuration of the optical measuring device 100 according to the first exemplary embodiment. FIG. 3 schematically illustrates a configuration of the optical measuring device 100 according to the first exemplary embodiment.

The optical measuring device 100 according to the first exemplary embodiment includes an illumination unit 10, an optical system 20, a light receiving unit 30, and a control unit 40.

The illumination unit 10 includes a light source 11, a diffusion unit 12, and a transmitter lens 13 that are disposed in a housing (not illustrated in the drawings).

A light emitted from the light source 11 of the illumination unit 10 are isotropically (in a Y-direction and a Z-direction in FIG. 3) diffused by the diffusion unit 12. After that, the transmitter lens 13 collimates the diffused light and the collimated light is transmitted toward the optical system 20.

Hereinafter, a space between the illumination unit 10 and the optical system 20, through which the collimated light passes, in which a measurement object 500 is placed, is referred to as a measurement space 101. In the measurement space 101, a direction opposite to a transmission direction of the collimated light is referred to as an X-direction (also referred to as a first direction), directions perpendicular to each other in a plane normal to the X-direction are referred to as the Y-direction (also referred to as a third direction) and the Z-direction (also referred to as a second direction), respectively. In other words, the X-direction is parallel to an optical axis of the collimated light passing through the measurement space 101, the Y-direction is a thickness direction of the collimated light passing through the measurement space 101, and the Z-direction is a width direction of the collimated light passing through the measurement space 101.

The optical system 20 includes a first lens 21, an aperture 22, and a second lens 23 that are disposed in the housing (not illustrated in the drawings).

The collimated light incident on the optical system 20 is condensed by the first lens 21, passes through an opening of the aperture 22, and is again collimated by the second lens 23. The collimated light transmitting through the second lens 23 is incident on the light receiving unit 30. The optical system 20 is desirably configured as a both-side telecentric optical system because it is necessary to prevent dimensional variability of an image on a light receiving surface 31 of the light receiving unit 30 due to position variability of the measurement object 500 in the X-direction.

The light receiving unit 30 is configured as a two-dimensional image sensor. Various two-dimensional image sensors in which two or more pixels are two-dimensionally arranged such as a two-dimensional CCD (Charge Coupled Device) image sensor and a two-dimensional CMOS (Complementary Metal Oxide Semiconductor) image sensor can be used as the two-dimensional image sensor. In the two dimensional image sensor of the light receiving unit 30, the pixels are two-dimensionally arranged in the thickness direction (the Y-direction) and the width direction (the Z-direction) of the collimated light transmitted from the second lens 23 to the light receiving surface 31. The light receiving unit 30 outputs a signal SIG that is an analog signal indicating a distribution of intensity of a light received on the light receiving surface 31. Hereinafter, the distribution of intensity of the received light is referred to as a received light intensity distribution.

The two-dimensional image sensor is disposed to tilt the light receiving surface 31 by an angle θ with respect to the plane normal to the optical axis of the collimated light incident on the light receiving surface 31. In other words, the two-dimensional image sensor is disposed to rotate the light receiving surface 31 by the angle θ around an axis parallel to the Z-direction. Thus, it can be understood that the light receiving surface 31 is strictly parallel to the Z-direction and a direction rotated by the angle θ around the axis parallel to the Z-direction with respect to the Y-direction. However, because the angle θ is a relatively small value, the direction perpendicular to the Z-direction on the light receiving surface 31 will be appropriately referred to as the Y-direction for simplicity hereinafter.

The control unit 40 includes an analog to digital (A/D) converter 41, a central processing unit (CPU) 42, a memory 43, an input device 44, an output device 45, and a display device 46 that are disposed in the housing (not illustrated in the drawings).

The A/D converter 41 converts the signal SIG output from the light receiving unit 30 into a digital signal and outputs the converted digital signal to the CPU 42. In order to hold the received light intensity distribution on the light receiving surface 31 indicated by the digital signal output from the A/D converter 41, the digital signal may be stored in a memory not illustrated in the drawings.

The CPU 42 is configured to be capable of performing predetermined signal processing on the received digital signal, performing an operation of measuring the measurement object 500, detecting where the measurement object 500 is located in the measurement space 101, detecting a tilt of the measurement object 500 with respect to the Z-direction, or converting the received light intensity distribution of the light receiving unit 30 into a format that can be displayed. A detection result and operation result can be appropriately written in the memory 43. The CPU 42 can appropriately read desired data from the memory 43.

A control program of the control unit 40 may be stored in the memory 43. The CPU 42 may read the control program from the memory 43 to perform the processing of the CPU 42 and a measuring operation of the optical measuring device 100. Although not illustrated in the drawings, the CPU 42 may control operations of various circuits incorporated in the optical measuring device 100 while controlling an emitting operation of the illumination unit 10 according to the control program.

In the memory 43, the data read and written by the control unit 40 and the above-described control program may be stored in the same memory device, respectively stored in separated areas in the same memory device, stored so as to be physically separated by disposing a plurality of memory devices, or stored by various storage methods. Various types of memory devices such as a hard disc, a SSD (Solid State Drive), and a flash memory can be used as the memory 43.

The input device 44 is a device for providing various data and commands to the optical measuring device 100. Various input devices such as a switch, a joystick, a keyboard, a mouse, and a USB (Universal Serial Bus) port can be used as the input device 44.

The output device 45 is a device for outputting various data and measurement results to the outside of the optical measuring device 100. Various output devices such as a printer and the USB port can be used as the output unit 45.

The display device 46 is a device for displaying various visible information such as setting contents, data, progress of measurement, measurement results, and information provided for a user's operation in the optical measuring device 100. Various display devices such as a liquid crystal display can be used as the display device 46. The display device 46 can display information indicating that the measurement object 500 has deviated from the measurement space 101 when receiving a signal indicating an unmeasurable state from the CPU 42.

Figure 4:
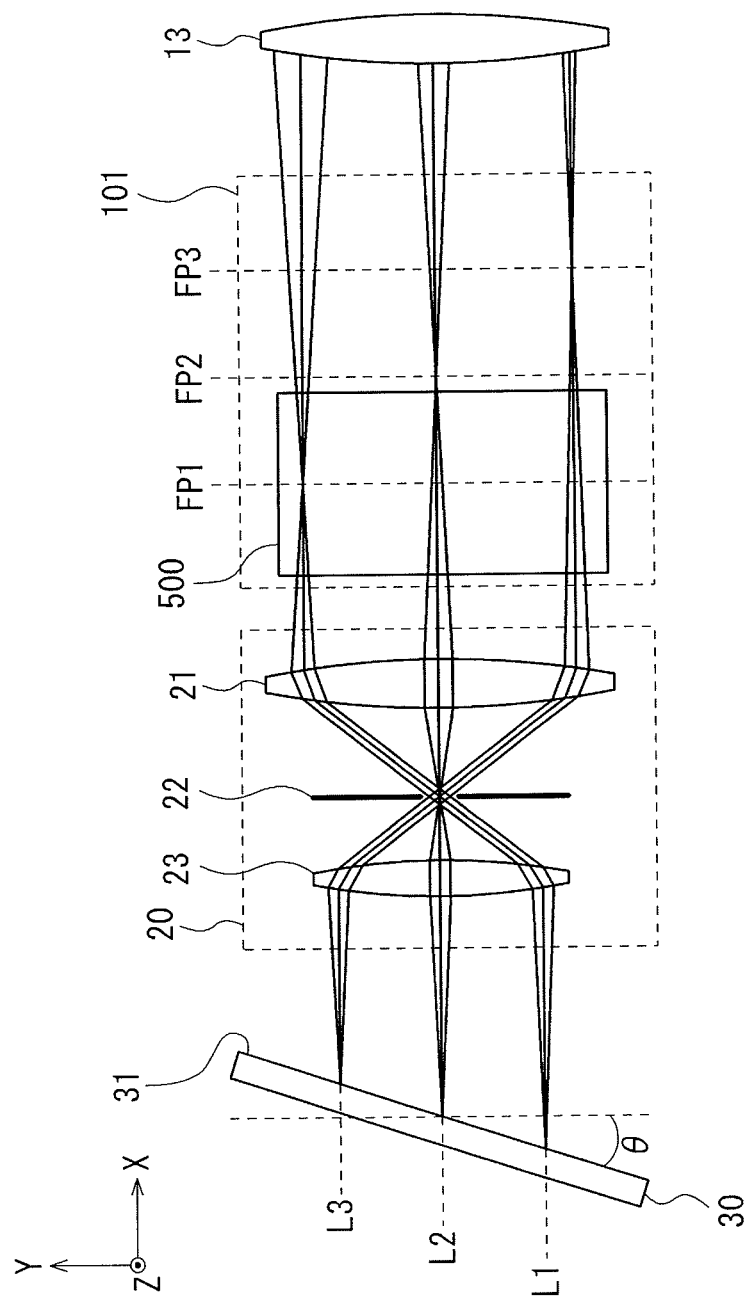
FIG. 4 schematically illustrates focal positions and imaging states corresponding to the respective focal positions in a measurement space.
Figure 5:
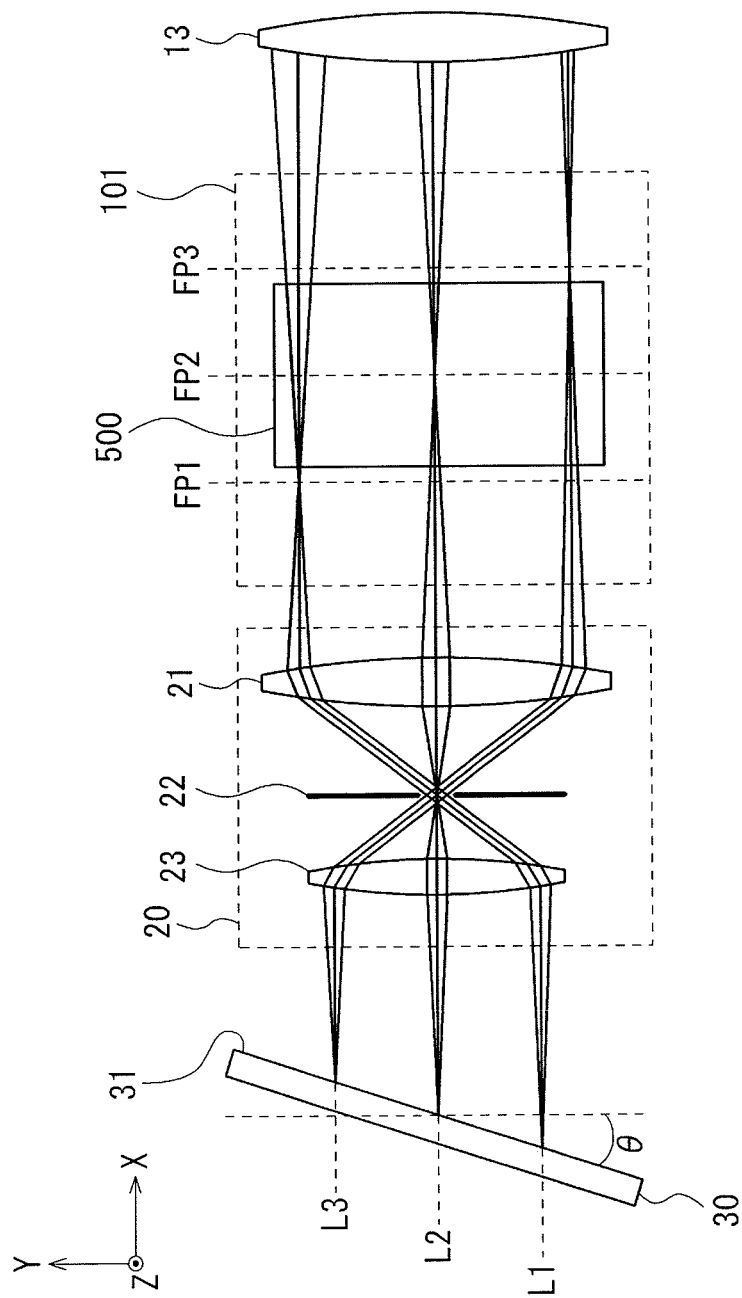
FIG. 5 schematically illustrates the focal positions and the imaging states corresponding to the respective focal positions in the measurement space.
Figure 6:
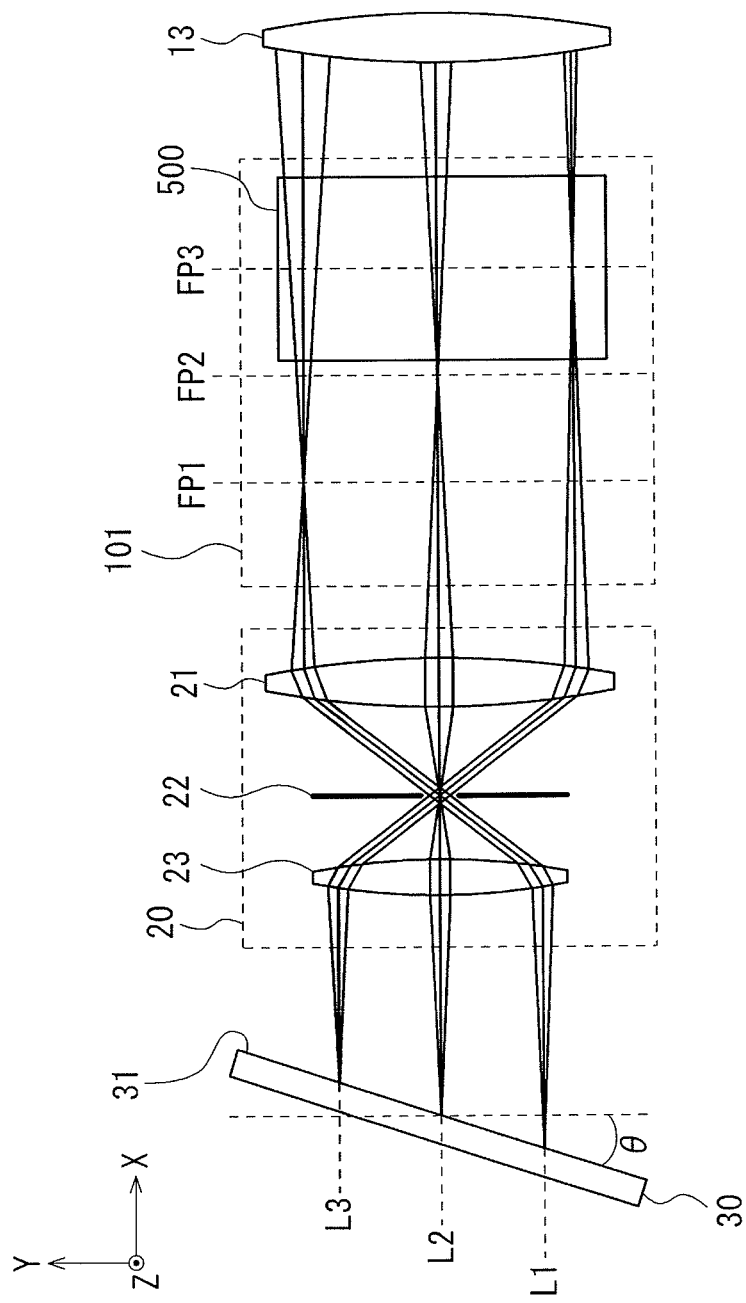
FIG. 6 schematically illustrates the focal positions and the imaging states corresponding to the respective focal positions in the measurement space.

Next, an operation of the optical measuring device 100 will be described with reference to the drawings. FIGS. 4 to 6 schematically illustrate focal positions and imaging states corresponding to the respective focal positions in the measurement space 101. In FIGS. 4 to 6, focal planes parallel to a Y-Z plane will be considered as the focal positions. Here, focal positions FP1 to FP3 that are located at different positions in the X-direction in the measurement space 101 will be considered. The focal position FP1 is the closest to the light receiving unit 30, the focal position FP3 is the farthest from the light receiving unit 30, and the focal position FP2 is located in the middle between the focal position FP1 and the focal position FP3. As illustrated in FIGS. 4 to 6, the angle θ is adjusted to provide images corresponding to the focal positions FP1 to FP3 at imaging positions L1 to L3 separated in the Y-direction on the light receiving surface 31 of the light receiving unit 30. Note that, in FIG. 2, a light reaching the imaging position L2 on the light receiving surface 31 is represented as a representative example.

Here, the configuration and operation of the optical measuring device 100 will be described using the imaging positions L1 to L3 described above, and, however, this is merely for the sake of convenience to describe position dependency of the received light intensity distribution on the light receiving surface 31 of the light receiving unit 30. Thus, the locations of the imaging positions L1 to L3 may not be fixed and may be appropriately selected. The number of the imaging positions L1 to L3 is merely an example, and any number of the imaging positions may be set.

As illustrated in the top view of FIG. 4, when an edge of the measurement object 500 is located at the focal position FP1 close to the light receiving surface 31 of the light receiving unit 30, a light passing through the edge of the measurement object 500 and incident on the light receiving surface 31 forms an image at the imaging position L1 farthest from the second lens 23 on the light receiving surface 31. At a position in the Y-direction other than the imaging position L1 on the light receiving unit 31, the image corresponding to the focal position FP1 is not formed. Hereinafter, for simplicity, a circular cylindrical shape object is assumed as the measurement object 500 and an axis direction of the circular cylindrical shape is parallel to the Y-direction.

Figure 7:
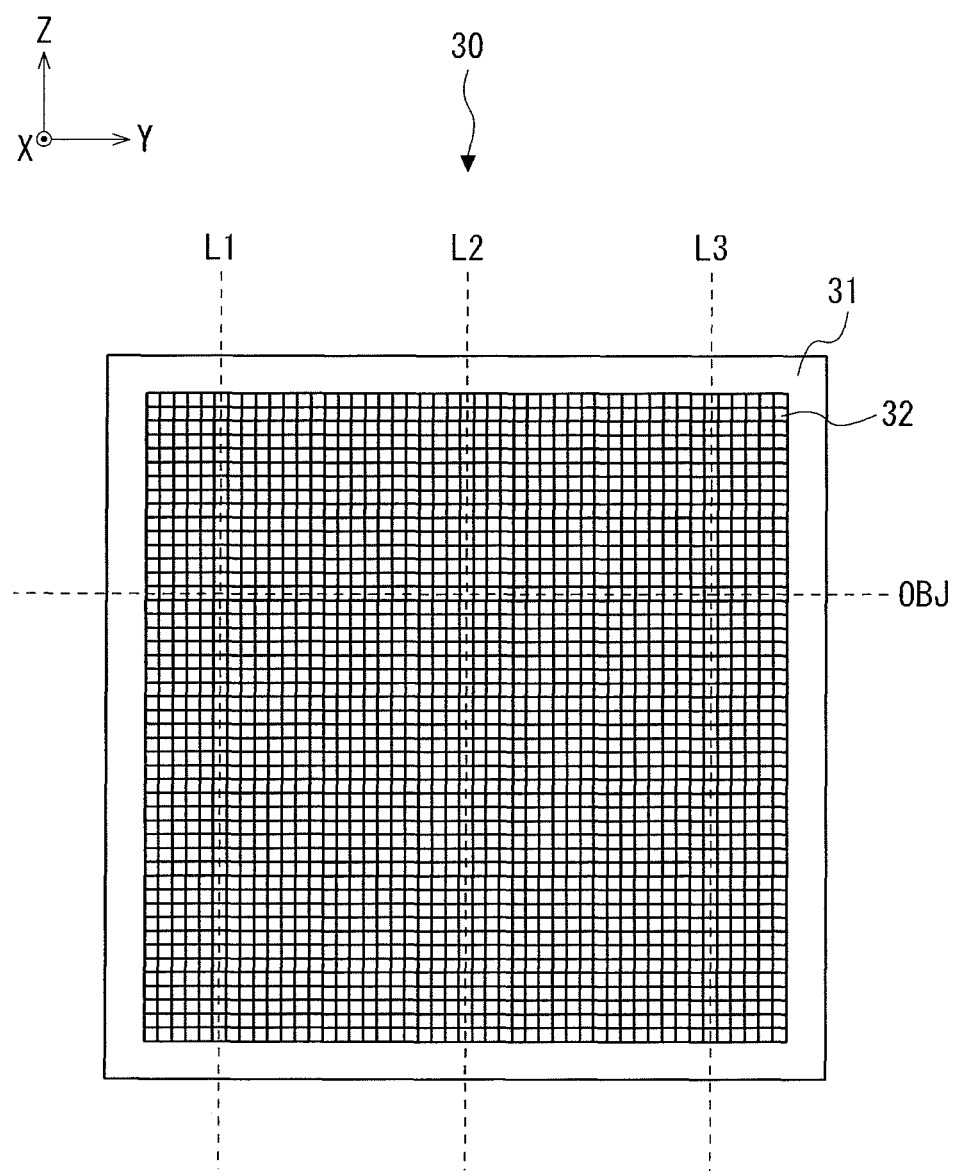
FIG. 7 illustrates light receiving elements two-dimensionally arranged on a light receiving surface of a light receiving unit and the imaging positions on the light receiving surface.

FIG. 7 illustrates light receiving elements 32 two-dimensionally arranged in the Y direction and the Z-direction on the light receiving surface 31 of the light receiving unit 30 and the imaging positions on the light receiving surface 31. As illustrated in FIG. 7, it can be understood that the light receiving elements 32 arranged in the Z-direction constitute a row and the plural rows are arranged in the Y-direction, and the imaging position L1 corresponding to the focal position FP1 is located along the row apart from the center of the light receiving surface 31 in a minus direction of a Y-axis. A line OBJ in FIG. 7 indicates a profile of a circular cylindrical shape parallel to the Y-direction, or a position of the edge of a side surface of the circular cylindrical shape, when the measurement object 500 of the circular cylindrical shape is placed in the measurement space 101 in such a manner that a center axis of the circular cylindrical shape is parallel to the Y-axis and viewed in the X-direction, for example. Here, the line OBJ indicates the edge of an upper side (a side from the center of the light receiving surface 31 in a plus direction of a Z-axis) of the side surface of the circular cylindrical shape.

It can be understood that the imaging position L3 corresponding to the focal position FP3 is located along the row apart from the center of the light receiving surface 31 in a plus direction of the Y-axis, which is included in the rows in which the light receiving elements 32 are arranged in the Z-direction.

It can be understood that the imaging position L2 corresponding to the focal position FP2 is located along the row near a midpoint between the imaging position L1 and the imaging position L3, which is included in the rows in which the light receiving elements 32 are arranged in the Z-direction.

Since the image corresponding to the focal position FP1 is formed at the imaging position L1, intensity of the light received by the light receiving elements 32 at the imaging position L1 is sharply changed from dark to bright in the Z-direction in the vicinity of the line OBJ due to the edge of the circular cylindrical shape. Since the image is not formed (defocused) at the imaging position L2, intensity of a light incident on the imaging position L2 is lower than intensity of the light incident on the imaging position L1. Since the image is further defocused at the imaging position L3, intensity of the light incident on the imaging position L3 is further lower than the intensity of the light incident on the imaging position L2.

Figure 8:
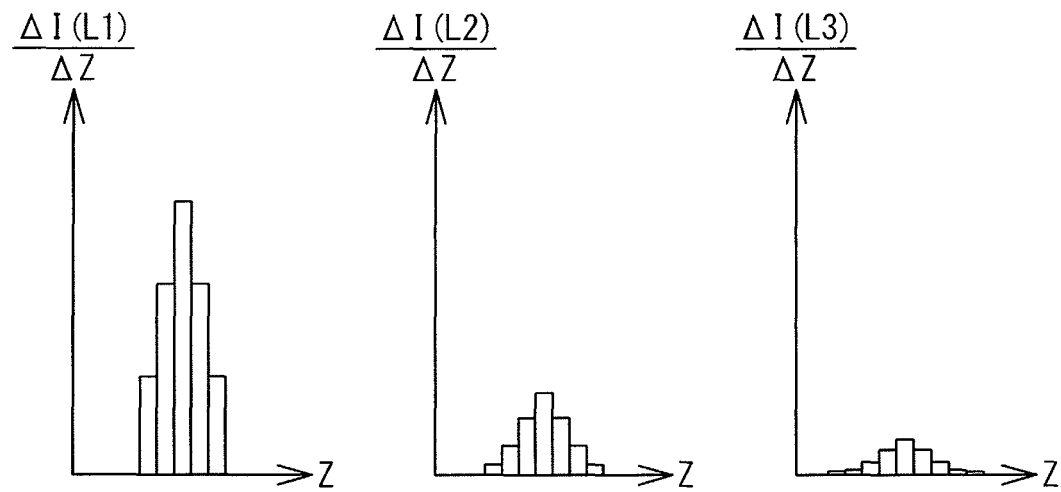
FIG. 8 illustrates differential values of received light intensity of the light receiving elements when an image corresponding to a focal position FP1 is formed at an imaging position L1 on the light receiving surface.

When the intensity of the light received by the light receiving elements 32 along each of the imaging positions L1 to L3 is differentiated with Z, an extreme value appears in a differential value at each imaging position. Here, for considering a case in which the image is sharply changed from dark to bright, a local maximum value appears in the differential value at each imaging position when the intensity of the light received by the light receiving elements 32 at each of the imaging positions L1 to L3 is differentiated with Z. FIG. 8 illustrates the differential values of the intensity of the light received by the light receiving elements when the image corresponding to the focal position FP1 is formed at the imaging position L1 on the light receiving surface 31. As illustrated in FIG. 8, since the image is formed at the imaging position L1, the received light intensity is widely changed. Thus, the differential value ($\Delta I/\Delta Z$) of the received light intensity I(L1) at the imaging position L1 has a high local maximum value (a peak value) and is distributed in a narrow range. In contrast, the image corresponding to the focal position FP1 is not formed (defocused) at the imaging positions L2 and L3 on the light receiving surface 31. Thus, the intensity of the light received by the light receiving elements 32 is not changed or is gradually changed in the Z-direction in the vicinity of an intersection of the line OBJ and the imaging position L2 and an intersection of the line OBJ and the imaging position L3. Therefore, as illustrated in FIG. 8, the differential value of the received light intensity I(L2) at the imaging position L2 and the differential value of the received light intensity I(L3) at the imaging position L3 have the local maximum values (peak values) smaller than that at the imaging position L1 and the distributions of the differential values become gentle depending on a distance from the imaging position L1.

As described above, the peak value (the local maximum value) of the differential value ($\Delta I/\Delta Z$) of the received light intensity I(L1) at the imaging position L1 becomes larger than those at the imaging positions L2 and L3. Therefore, in the example illustrated in FIG. 8, it can be determined that the focal position of the measurement object 500, or the edge, is located at the focal position FP1. As described above, by determining at which imaging position the local maximum value of the differential value ($\Delta I/\Delta Z$) of the received light intensity I becomes the maximum, it is possible to determine the imaging position at which the image of the measurement object 500 is formed.

Next, as illustrated in the top view of FIG. 5, when the edge of the measurement object 500 is located at the focal position FP2 that is the second closest to the light receiving surface 31 of the light receiving unit 30, the light passing through the edge of the measurement object 500 located at the focal position FP2 and incident on the light receiving surface 31 forms the image at the imaging position L2 in the vicinity of the center of the light receiving surface 31. At a position in the Y-direction other than the imaging position L2 on the light receiving surface 31, the image corresponding to the focal position FP2 is not formed (defocused).

Since the image corresponding to the focal position FP2 is formed at the imaging position L2, the intensity of the light received by the light receiving elements 32 at the imaging position L2 is sharply changed from dark to bright in the Z-direction in the vicinity of the line OBJ due to the edge of the circular cylindrical shape. Since the image is not formed at the imaging positions L1 and L3, the intensity of the light incident on each of the imaging positions L1 and L3 is smaller than that at the imaging positions L2.

Figure 9:
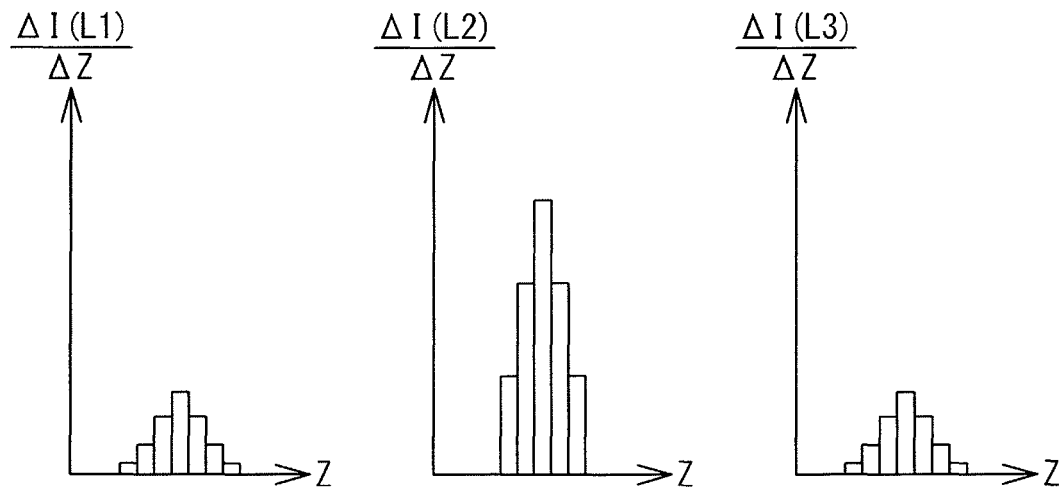
FIG. 9 illustrates the differential values of the received light intensity of the light receiving elements when an image corresponding to a focal position FP2 is formed at an imaging position L2 on the light receiving surface.

The local maximum value appears in the differential value at each of the imaging positions L1 to L3 when the intensity of the light received by the light receiving elements 32 at each of the imaging positions L1 to L3 is differentiated with Z. FIG. 9 illustrates the differential values of the intensity of the light received by the light receiving elements when the image corresponding to the focal position FP2 is formed at the imaging position L2 on the light receiving surface 31. As illustrated in FIG. 9, since the image is formed at the imaging position L2, the received light intensity is widely changed. Therefore, the differential value ($\Delta I/\Delta Z$) of the received light intensity I(L2) at the imaging position L2 has a large local maximum value (a peak value) and is distributed within a narrow range. In contrast, the image corresponding to the focal position FP2 is not formed (defocused) at the imaging positions L1 and L3 on the light receiving surface 31. Thus, the intensity of the light received by the light receiving elements 32 is loosely changed or not changed in the Z-direction in the vicinity of an intersection of the line OBJ and the imaging position L1 and the intersection of the line OBJ and the imaging position L3. Therefore, as illustrated in FIG. 9, the differential value of the received light intensity I(L1) at the imaging position L1 and the differential value of the received light intensity I(L3) at the imaging position L3 have the local maximum values (peak values) smaller than that at the imaging position L2 and are distributed more loosely than that at the imaging position L2.

As described above, it can be understood that the differential value ($\Delta I/\Delta Z$) of the received light intensity I(L2) at the imaging position L2 becomes larger than those at the imaging positions L1 and L3. Therefore, in the example illustrated in FIG. 9, it is possible to determine that the focal point of the measurement object 500, or the edge thereof, is located at the focal position FP2.

Subsequently, as illustrated in the top view of FIG. 6, when the edge of the measurement object 500 is located at the focal position FP3 that is the farthest from the light receiving surface 31 of the light receiving unit 30, the light passing through the edge of the measurement object 500 located at the focal position FP3 and incident on the light receiving surface 31 forms the image at the position L3 on the light receiving surface 31, which is the closest to the second lens 23. At a position in the Y-direction other than the imaging position L3 on the light receiving surface 31, the image corresponding to the focal position FP3 is not formed (defocused).

Since the image corresponding to the focal position FP3 is formed at the imaging position L3, the intensity of the light received by the light receiving elements 32 at the imaging position L3 is sharply changed from dark to bright in the Z-direction in the vicinity of the line OBJ due to the edge of the circular cylindrical shape. Since the image is not formed (defocused) at the imaging positions L1 and L2, the intensity of the light incident on each of the imaging positions L1 and L2 is smaller than that at the imaging positions L3.

Figure 10:
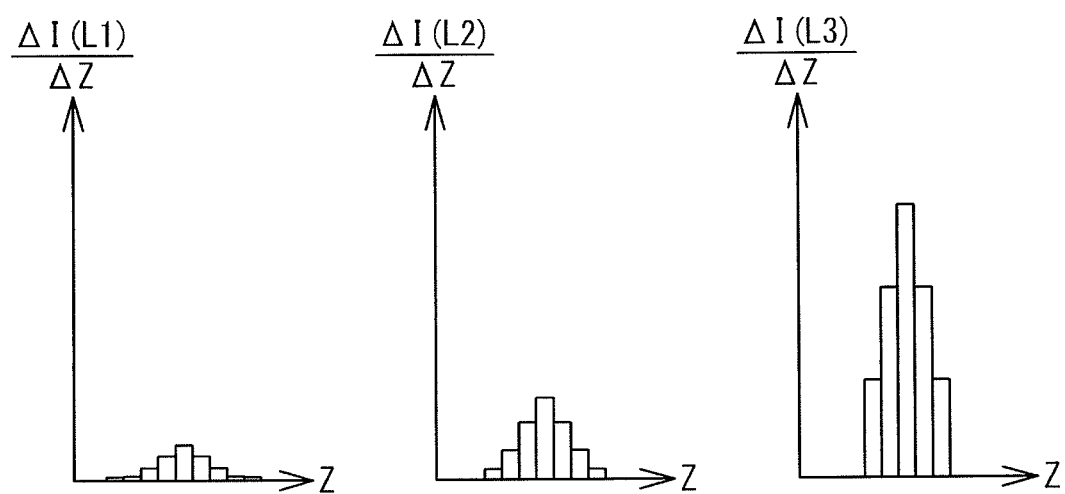
FIG. 10 illustrates the differential values of the received light intensity of the light receiving elements when an image corresponding to a focal position FP3 is formed at an imaging position L3 on the light receiving surface.

The local maximum value appears in the differential value at each of the imaging positions L1 to L3 when the intensity of the light received by the light receiving elements 32 at each of the imaging positions L1 to L3 is differentiated with Z. FIG. 10 illustrates the differential values of the intensity of the light received by the light receiving elements when the image corresponding to the focal position FP3 is formed at the imaging position L3 on the light receiving surface 31. As illustrated in FIG. 10, since the image is formed at the imaging position L3, the received light intensity is widely changed. Therefore, the differential value ($\Delta I/\Delta Z$) of the received light intensity I(L3) at the imaging position L3 has a large local maximum value (a peak value) and is distributed within a narrow range. In contrast, the image corresponding to the focal position FP3 is not formed (defocused) at the imaging positions L1 and L2 on the light receiving surface 31. Thus, the received light intensity of the light receiving elements 32 is loosely changed or not changed in the Z-direction in the vicinity of the intersection of the line OBJ of the imaging position L1 and the intersection of the line OBJ of the imaging position L2. Therefore, as illustrated in FIG. 10, the differential value of the received light intensity I(L1) at the imaging position L1 and the differential value of the received light intensity I(L2) at the imaging position L2 have the local maximum values (peak values) smaller than that at the imaging position L3 and the distributions of the differential values becomes gentle depending on a distance from the imaging position L3.

As described above, it can be understood that the differential value ($\Delta I/\Delta Z$) of the received light intensity I(L3) at the imaging position L3 becomes larger than those at the imaging positions L1 and L2. Therefore, in the example illustrated in FIG. 10, it is possible to determine that the focal point of the measurement object 500, or the edge thereof, is located at the focal position FP3.

As described above, by determining at which position in the Y-direction on the light receiving surface 31 the differential value of the received light intensity becomes the local maximum value, it is possible to detect the position of the focal position in the X-direction, or where the measurement object is placed in the measurement space 101.

When an approximate shape of the measurement object 500 has been already known, the images are formed at all the positions L1 to L3 depending on the measurement object 500. In this case, when the edge of the measurement object 500 corresponding to the formed image is approximately a straight line, it is possible to detect the amount of rotation around the Z-direction of the measurement object 500. In this case, the local maximum values appear in the differential values of the received light intensity in the Z-direction at the imaging positions L1 to L3 and it can be determined that the images are formed at all the imaging positions L1 to L3 when these local maximum values fall within a predetermined range.

In the present configuration, since it is sufficient to use only one two-dimensional image sensor, the device configuration can be simpler than that of an optical measuring device using a plurality of image sensors and performing the similar operation. Thus, it is possible to achieve a reduction in manufacturing cost, an improvement in maintainability and reliability, and simplification of adjusting optical components. Further, since there is no need to distribute the lights to the image sensors, it is not necessary to dispose beam splitters and half mirrors. Thus, it is possible to reduce the number of components and prevent the light intensity incident on each image sensor from decreasing. As a result, an improvement in measurement accuracy and speed-up of measurement can be achieved. Since the use of the half mirror can be prevented, a concern of occurrence of ghost due to the half mirror can be also prevented.

Second Exemplary Embodiment

Figure 11:
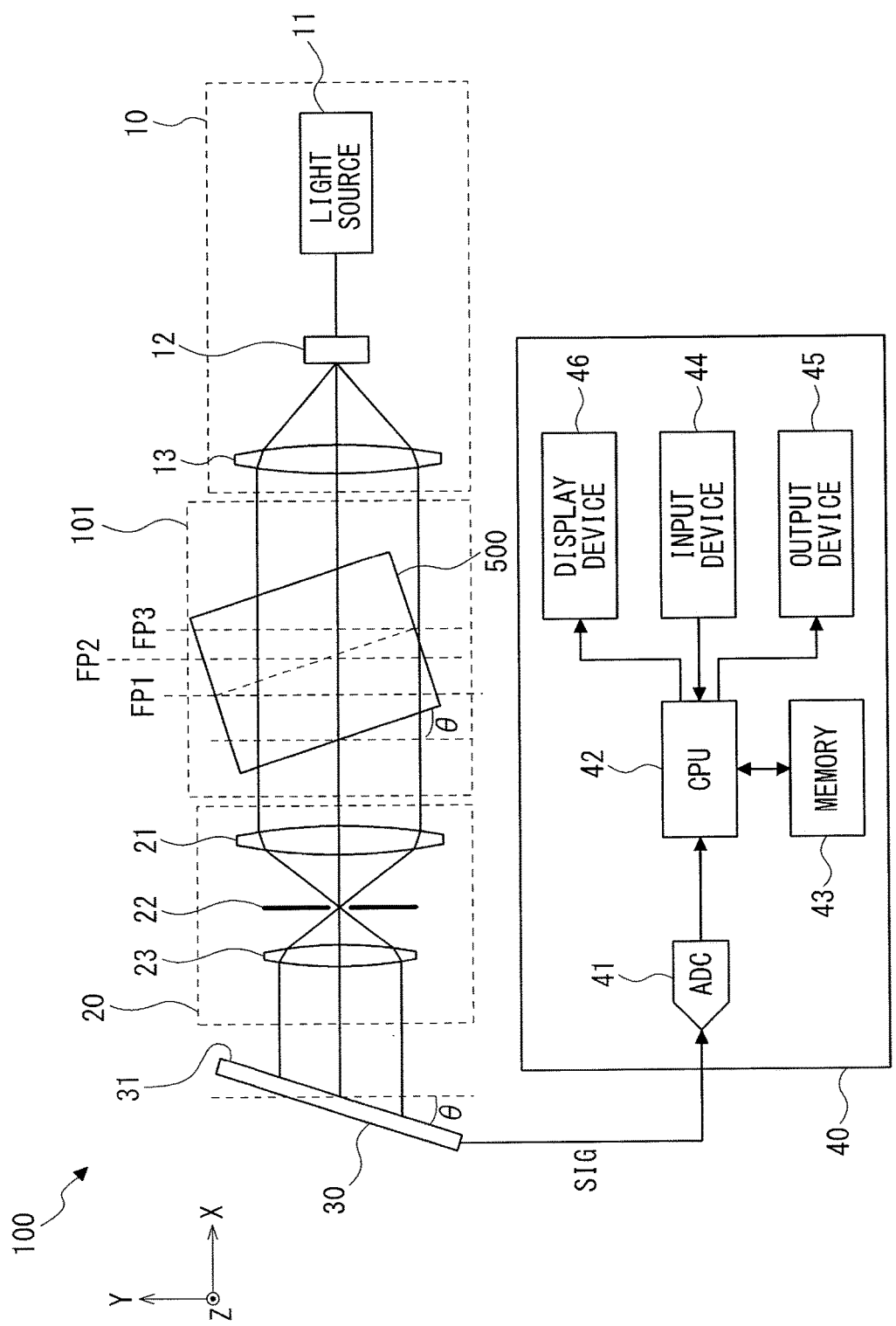
FIG. 11 illustrates a location of a measurement object in an optical measuring device according to a second exemplary embodiment.

Hereinafter, an optical measuring device according to a second exemplary embodiment will be described. In the first exemplary embodiment described above, the axis direction of the measurement object 500 of the circular cylindrical shape is parallel to the Y-direction. However, the axis direction of the circular cylindrical shape may not be parallel to the Y-direction depending on a situation when the measurement object 500 has been placed in the measurement space 101. FIG. 11 illustrates a location of the measurement object in the optical measuring device according to the second exemplary embodiment. In the present exemplary embodiment, as illustrated in FIG. 11, the measurement object 500 is rotated by the angle θ around the Z-direction in such a manner that the edge of the measurement object 500 is located at the focal positions FP1 to FP3. The axis of the measurement object 500 is also rotated by an angle φ around the Y-direction.

Figure 12:
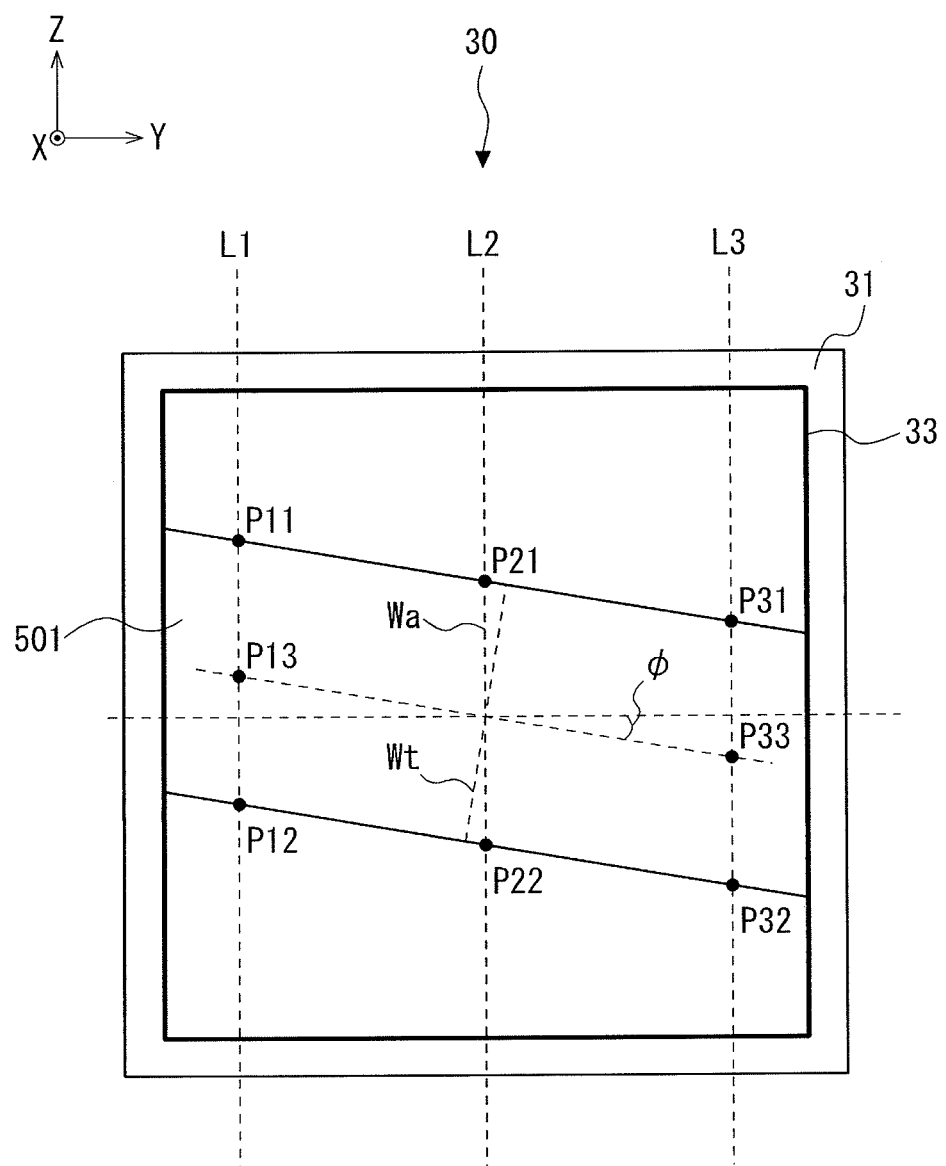
FIG. 12 is a diagram illustrating an image of the measurement object formed on a light receiving surface of the optical measuring device according to the second exemplary embodiment.

In this case, the image of the measurement object 500 is formed on the light receiving surface 31 of the light receiving unit 30. FIG. 12 is a diagram illustrating the image of the measurement object formed on the light receiving surface of the optical measuring device according to the second exemplary embodiment. In FIG. 12, dark parts of the image are denoted by a numerical sign 501. As illustrated in FIG. 12, since the axis direction of the measurement object 500 is rotated by the angle φ around the Y-direction in the measurement space 101, the image on the light receiving surface 31 is also tilted by the angle φ around the Y-direction. When a dimension of the measurement object 500 in the Z-direction is measured in this situation, a dimension Wa longer than a real dimension of the measurement object 500 is measured due to the tilt.

Thus, in the present exemplary embodiment, a method of correcting the tilt using the received light intensity distribution on the light receiving surface 31 when the image is formed and accurately obtaining the dimension of the measurement object 500 will be considered. Note that, in FIG. 12, an area in which the light receiving elements 32 are arranged is represented as a light receiving area 33.

First, the optical measuring device 100 measures the received light intensity distribution on the light receiving surface 31 when the image is formed. The CPU 42 writes the measured received light intensity distribution in the memory 43.

The CPU 42 reads data of the received light intensity detected in the rows (e.g. two rows) in the vicinity of the imaging position L1, in which the light receiving elements 32 are arranged in the Z-direction, from the memory 43 and calculates end points P11 and P12 at which the received light intensity is sharply changed. It should be appreciated that the end points P11 and P12 are located on a line parallel to the Z-direction. After that, the CPU 42 calculates a midpoint P13 between the end points P11 and P12.

The CPU 42 reads data of the received light intensity detected by the rows (e.g. two rows) in the vicinity of the imaging position L3, in which the light receiving elements 32 are arranged in the Z-direction, from the memory 43 and calculates end points P31 and P32 at which the received light intensity is sharply changed. It should be appreciated that the end points P31 and P32 are located on a line parallel to the Z-direction. After that, the CPU 42 calculates a midpoint P33 between the end points P31 and P32.

The CPU 42 calculates a tilt of a line between the midpoint P13 and the midpoint P33 with respect to the Y-direction. In other words, the CPU 42 calculates the angle cp.

The CPU 42 reads data of the received light intensity detected by the rows (e.g. four rows) in the vicinity of the imaging position L2, in which the light receiving elements 32 are arranged in the Z-direction, from the memory 43 and calculates end points P21 and P22 at which the received light intensity is sharply changed. It should be appreciated that the end points P21 and P22 are located on a line parallel to the Z-direction.

After that, the CPU 42 calculates the dimension Wa between the end points P21 and P22 in the Z-direction. Thus, an accurate dimension Wt of the measurement object 500 can be calculated by multiplying the dimension Wa by cow.

As described above, according to the present configuration, even when the image on the light receiving surface of the image sensor is tilted, it is possible to detect the tilt of the image using the received light intensity distribution on the light receiving surface and accurately detect the dimension of the measurement object 500 by performing tilt correction.

Further, according to the present configuration, since the tilt correction is performed using only a part of the received light intensity distribution, it is possible to accurately and quickly measure the dimension.

In the present exemplary embodiment, the example in which the image of the single measurement object 500 is formed on the light receiving surface 31 of the light receiving unit 30 and the width of the dark part 501 is measured, and, however, it is merely an example. For example, it should be appreciated that a width of a dark part between images of two measurement objects can be also measured by performing a similar correction.

Other Exemplary Embodiments

Note that the present invention is not limited to the aforementioned exemplary embodiments and may be changed as appropriate without departing from the spirit of the present invention. For example, by defining a relation between the imaging states at the imaging positions L1 to L3 and the measurement objects having various shapes and by observing the images at the imaging positions L1 to L3, a configuration of detecting the rotation amount of the measurement object can be achieved even when the image is not formed on a part or all of the imaging positions L1 to L3.

It should be appreciated that the position of the measurement object 500 in the measurement space 101 can be detected by specifying a Z coordinate of the differential value of the received light intensity at a part or all of the imaging positions L1 to L3.

It is possible to control the operation of the above-described optical measuring device from the outside thereof, for example, by connecting another control device and another display device to the optical measuring device.

The above-described optical system of the optical measuring device is merely an example, and other configurations of the optical device may be adopted as long as the two-dimensional image sensor can be arranged to tilt with respect to the optical axis of the collimated light that is irradiated from the light source and passes through the measurement space.

The configuration of the above-described control unit is merely an example, another configuration may be adopted as long as the similar operation can be performed as the above-described exemplary embodiments.

In the exemplary embodiments described above, the example in which the two-dimensional image sensor constituting the light receiving unit 30 outputs the signal SIG serving as the analog signal, the A/D converter of the control unit 40 converts the signal SIG into the digital signal, and the converted digital signal is input to the CPU 42 has been described, and, however, it is merely an example. For example, the A/D converter may be disposed in the two-dimensional image sensor constituting the light receiving unit 30, the analog signal indicating the detection result may be converted into the digital signal in the two-dimensional image sensor, and the converted digital signal is provided to the CPU 42. Thus, it is possible to simplify the configuration of the control unit and achieve cost down and miniaturization of the mounting area.

In the exemplary embodiments described above, the case in which the image is changed from dark to bright is considered and the example in which the received light intensity of the light receiving elements 32 is differentiated with Z and the position at which the local maximum value appears in the differential value is detected is described. On the other hand, when the case in which the image is changed from bright to dark is considered, the received light intensity of the light receiving elements 32 may be differentiated with Z, the position at which the local minimum value appears in the differential value may be detected, and the position in the Y-direction on the light receiving surface at which the local minimum value becomes the minimum may be detected. In other words, it is sufficient to detect the extreme value including the local maximum value and the local minimum value of the differential value and to detect where the absolute value of the detected extreme value becomes the maximum in the Y-direction.

Further, for example, a distance between the focal position FP1 and the focal position FP3 may be changeable by adjusting the rotation angle θ of the two-dimensional sensor constituting the light receiving unit 30. Thus, it is possible to expand an observation range of the focal position in the X-direction in the measurement space 101 by increasing the angle θ. When the angle θ is 0, the focal positions FP1 and FP3 match the focal position FP2. In this case, since the approximate differential values are detected at the imaging position L1 to L3, the edge can be more accurately detected by averaging the detected differential values. As described above, the desired observation range of the focal position and the edge detection can be advantageously used by appropriately adjusting the angle θ. The adjustment of the angle θ can be achieved, for example, by driving an actuator (not illustrated in the drawings) connected to the light receiving unit 30 by the control unit 40.

From the disclosure thus described, it will be obvious that the embodiments of the disclosure may be varied in many ways.

Such variations are not to be regarded as a departure from the spirit and scope of the disclosure, and all such modifications as would be obvious to one skilled in the art are intended for inclusion within the scope of the following claims.

What is claimed is:

1. An optical measuring device comprising:
    an illumination unit configured to emit a light parallel to a first direction to a measurement space in which a measurement object is placed;
    a light receiving unit configured to output a signal indicating a two-dimensional distribution of a light incident on a light receiving surface;
    an optical system configured to guide the light passing through the measurement space to the light receiving surface of the light receiving unit; and
    a control unit configured to detect a position of the measurement object in the first direction based on the signal output from the light receiving unit, wherein
    the light receiving surface of the light receiving unit is tilted by a predetermined angle around an axis parallel to a second direction that is perpendicular to the first direction with respect to a transmission direction of the light incident on the light receiving surface, and
    the control unit detects a position where light intensity is changed by a predetermined value in the second direction in the two-dimensional distribution of the light based on the signal output from the light receiving unit, detects a position where the detected position is located in a third direction that is perpendicular to the second direction, and detects the position where the measurement object is placed in the first direction in the measurement space based on the detected position in the third direction.

2. The optical measuring device according to claim 1, wherein
    the control unit:
    detects a differential value distribution of light intensity in the second direction in the two-dimensional distribution at two or more positions in the third direction based on the signal output from the light receiving unit,
    detects the position in the third direction where an absolute value of an extreme value of the differential value distribution becomes the maximum, and
    detects the position in the first direction where the measurement object is placed in the measurement space based on the detected position in the third direction.

3. The optical measuring device according to claim 2, wherein, when the absolute value of the extreme value of the differential value distribution in the second direction detected at the two or more positions in the third direction falls within a predetermined range, it is determined that the measurement object is rotated by the predetermined angle around the axis parallel to the second direction.

4. The optical measuring device according to claim 1, wherein the optical system is configured as a both-side telecentric optical system.

5. The optical measuring device according to claim 1, wherein
    the light receiving unit is a two-dimensional image sensor including a plurality of light receiving elements, and
    the light receiving elements are two-dimensionally arranged in the second direction and the third direction.

6. The optical measuring device according to claim 1, wherein
    the control unit:
    detects two edges of an image that are apart from each other in the second direction on the light receiving surface,
    detects a tilt of the two edges with respect to the third direction based on the two edges, and
    corrects a distance between the two edges in the second direction based on the detected tilt to calculate the distance between the two edges.

7. The optical measuring device according to claim 6, wherein
    the two edges correspond to edges of an image of one measurement object, or
    one of the two edges corresponds to an edge of one of two measurement objects and the other of the two edges corresponds to an edge of the other of two measurement objects.

8. The optical measuring device according to claim 6, wherein the control unit multiplies the distance between the two edges in the second direction by a cosine of an angle of the detected tilt to calculate the distance between the two edges.

* * * * *